United States Patent [19]

McNally

[11] Patent Number: 4,716,472

[45] Date of Patent: Dec. 29, 1987

[54] VARIABLE SPEED REPLAY OF DIGITAL AUDIO WITH CONSTANT OUTPUT SAMPLING RATE

[76] Inventor: Guy W. W. McNally, Burrowswood Lodge, Lawbrook Lane, Shere, Surrey, England

[21] Appl. No.: 768,030

[22] Filed: Aug. 21, 1985

[30] Foreign Application Priority Data

Aug. 23, 1984 [GB] United Kingdom ............... 8421378

[51] Int. Cl.$^4$ .................. G11B 5/09; G11B 27/28; H03H 17/06; G06F 7/62
[52] U.S. Cl. ..................................... 360/8; 360/10.1; 360/14.1; 364/724
[58] Field of Search ............... 360/8, 73, 51, 10.1, 360/10.2, 14.1, 14.2, 14.3; 364/723, 724

[56] References Cited

U.S. PATENT DOCUMENTS

| | | | |
|---|---|---|---|
| 3,571,081 | 3/1971 | Coolidge | 360/51 |
| 3,928,755 | 12/1975 | Bellanger et al. | 364/724 |
| 3,982,277 | 9/1976 | Naylor | 360/51 X |
| 3,988,607 | 10/1976 | Eggermont et al. | 364/724 |
| 3,997,773 | 12/1976 | Van Essen et al. | 364/723 |
| 4,020,332 | 4/1977 | Crochiere et al. | 364/723 |
| 4,161,001 | 7/1979 | Sakamoto | 360/10.3 |
| 4,270,183 | 5/1981 | Robinson et al. | 360/51 X |
| 4,301,480 | 11/1981 | Kitamura | 360/8 |
| 4,322,757 | 3/1982 | Hatakeyama | 360/14.2 |
| 4,348,699 | 9/1982 | Tsuchiya et al. | 360/73 X |
| 4,363,048 | 12/1982 | Tanaka et al. | 360/14.2 X |
| 4,413,289 | 11/1983 | Weaver et al. | 360/8 X |
| 4,449,154 | 5/1984 | Ohnishi et al. | 360/51 |
| 4,458,272 | 7/1984 | Heitmann | 360/51 X |
| 4,549,173 | 10/1985 | Nakamura | 360/14.1 X |
| 4,549,234 | 10/1985 | Sakamoto | 360/77 X |
| 4,564,918 | 1/1986 | McNally | 364/569 |

FOREIGN PATENT DOCUMENTS

| | | |
|---|---|---|
| 0052847 | 6/1982 | European Pat. Off. |
| 06092400 | 10/1983 | European Pat. Off. |
| 0137323 | 4/1985 | European Pat. Off. |
| 2070365 | 9/1981 | United Kingdom |

OTHER PUBLICATIONS

A Digital Approach to Interpolation, IEEE Proceedings, vol. 61, No. 6, Jun. 1973, by Schafer and Rabiner.
Francis Lee, Time Compression and Expansion of Speech by the Sampling Method, Journal of Audio Engineering Society, vol. 20, No. 9, Nov. 1972.

*Primary Examiner*—Stuart N. Hecker
*Assistant Examiner*—Alyssa H. Bowler
*Attorney, Agent, or Firm*—Robert F. O'Connell

[57] ABSTRACT

The apparatus comprises a manually operable device producing pulses which directly or after integration, determine the rate of replay of the digital audio. These pulses are counted by a counter. Each pulse corresponds to 1.5/500 s audio. The counter is reset at the rate $F_s/2048$ where $f_s$ is the constant output sampling rate and its contents are held in a latch whose contents are inversely proportional to the replay sampling period. Adders add the contents of the counter into overflowing accumulators and clocked at the KHz fixed sampling rate $f_s$ and 128 times this rate respectively. The number of SPR of the first accumulator represents the sample displacement while the MSB of the second accumulator provides the replay clock. The sample displacement (d) represents the displacement between an output sample and an input sample and controls a two stage interpolation by way of a finite impulse response filter and a linear interpolating filter.

10 Claims, 18 Drawing Figures

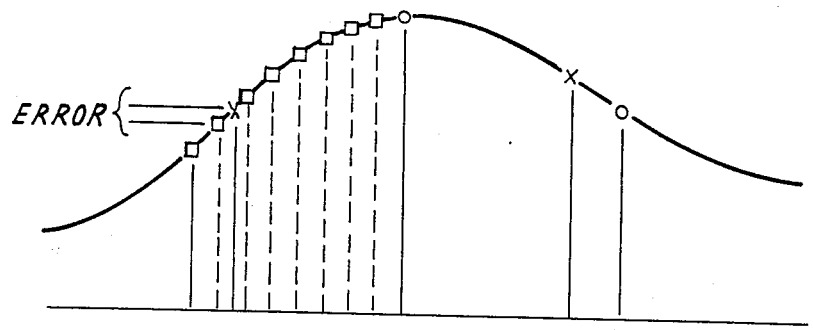
o INPUT SAMPLES
□ COMPUTED SAMPLES         FIG. 3
× REQUIRED OUTPUT SAMPLES
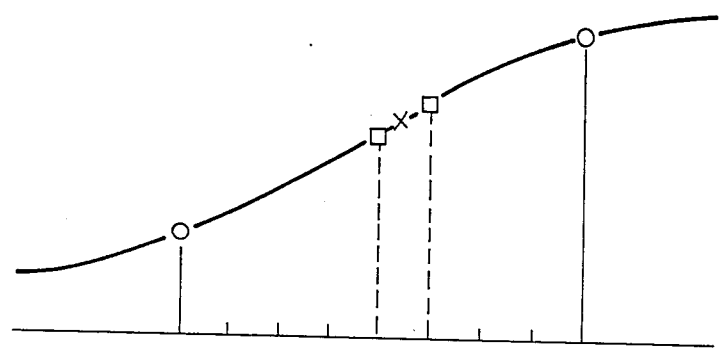
o INPUT
□ COMPUTE        FIG. 4
× OUTPUT
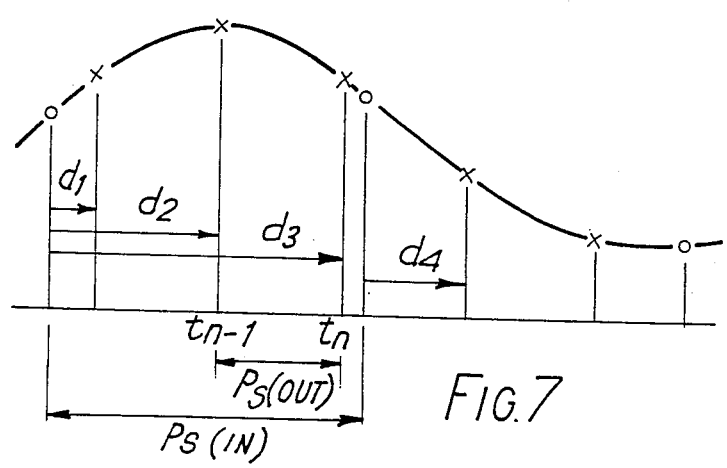
FIG. 7

VARIABLE SPEED REPLAY OF DIGITAL AUDIO WITH CONSTANT OUTPUT SAMPLING RATE

BACKGROUND OF THE INVENTION

1. Field of the Invention

This invention relates to a method of and apparatus for effecting variable speed replay of digital audio, with constant output sampling rate.

2. Prior Art

The design of conventional analogue audio recorders permits replay over a wide range of tape speeds. This is a particular useful feature exploited by sound editors for monitoring the tape at spooling speeds, or accurate location by 'rock and roll' at very low tape speeds, that is to say moving the tape backwards and forwards to home in on the desired location. No attempt is made to equalise the replay process because adequate intelligibility can be achieved without it and the low quality does not affect the final product. Tape speed varies from zero to up to 5 times normal speed. In contrast it is also customary to provide variable speed replay over a small range ($\pm 10\%$) to achieve deliberate pitch change, develop special effects such as flanging, or enable synchronisation with other machines. For these cases, the highest quality must be maintained since the speed change is part of the final product.

SUMMARY OF THE INVENTION

This invention is concerned with the problem of variable speed digital audio replay from tape or disc and the object of the invention is to provide a medium quality method and apparatus suitable for edit point location in an editing system in a digital audio tape recorder (DATR) which may be an actual tape recorder, a disc recorder, etc.

Broadly speaking the invention provides apparatus for effecting variable speed replay of digital audio with a constant output sampling rate, comprising a manually operable device for producing pulses at a rate establishing the rate of replay of the digital audio, means for counting these pulses to produce a number representative of the replay rate at a succession of intervals, means for adding this number into an overflowing accumulator device at a predetermined rate, and means responsive to output signals from the overflowing accumulator device to produce output samples at a given sampling rate by interpolation between the samples produced by replay.

The manually operable device may include a device producing pulses at a rate corresponding to a desired rate of change of rate of replay and an integrating device.

An overflowing accumulator device which is reset at a suitable multiple of the given sampling rate can produce overflow pulses establishing the clock signal for the variable speed reply. An overflow accumulator device which is reset at the given sampling rate can provide a number representing the sampling displacement.

BRIEF DESCRIPTION OF THE DRAWINGS

The invention will be described in more detail, by way of example, and with reference to the accompanying drawings, in which:

FIG. 3 shows how output samples may be generated by zero order interpolation of up-converted samples, FIG. 4 shows the preferred use of first order interpolation, FIG. 7 shows the time relationship between input and output samples.

Currently available DATRs provide variable speed replay by adjusting the tape speed and permitting all the electronics to change their processing speeds in direct proportion. This inevitably means that the sampling rate of a replayed digital audio signal will vary in direct proportion to the tape speed. When this is passed through a fixed reconstruction filter, impairments are introduced as detailed in FIGS. 1(a) and 1(b). The audio envelope is shown in full lines, the reconstruction filter characteristic in broken lines. In FIG. 1(a) there is a speed reduction of 12.5%; this leads to slight aliasing as shown by the stippled area. In FIG. 1(b) there is a speed increase of 12.5% leading to high frequency curtailment. For small speed changes, such as $\pm 12.5\%$, these impairments do not cause significant signal degradation.

If, however, a digital output from the DATR is required, e.g. for connection to a digital mixer, or transmission via an AES/EBU link, then steps must be taken to restore the sampling rate to the standard value denoted $f_s$ herein and which is normally 48 kHz. For very small speed changes (1 part in $10^5$) a wordslip 'synchroniser' can be used. For larger variations a sampling frequency convertor (SFC) must be used and with presently available equipment a range of approximately $-30\%$ to $+12.5\%$ is attainable. An SFC receives the input samples at a variable sampling rate $f_v$ and, by a process of interpolation, creates output samples at the standard rate $f_s$. A problem, discussed below, is the rate of change of tape speed because this makes further demands on the SFC design. At this time, commercially available SFC design will not cope with tape accelerations such as are to be found in normal studio practice.

A greater problem, is that without adaptive replay equalisation, a DATR will not work satisfactorily at low tape speeds and this makes studio techniques such as rock and roll impossible to achieve. This is currently circumvented by providing additional analogue tracks on the tape for variable speed replay at low/medium quality.

With disc-based digital audio recorders, such as a unit described in McNally, G. W. & Gaskell, P. S. Editing digital audio, IEEE Proc. ICASSP-84, San Diego, March 1984, Vol 1, pp 12B.4.1-4.4, some of these difficulties do not arise. The data reading speed is constant and a slow audio replay speed can be achieved by 'picking' data off the disc at a rate determined by the necessity to maintain a buffer which is being drained at the required rate. High speed replay is limited only by the maximum reading speed of the disc and its associated replay circuitry.

The remainder of this application explains how such a totally variable speed source of digital data can be configured and how the sampling frequency can be restored to a fixed rate $f_s$ under all conditions.

The basic scheme of generating a varying sampling rate/varying speed digital audio signal from disc relies upon a buffer (real-time input/output unit-RIO) which essentially becomes the system controller in that the system will monitor requests from RIO to provide data. The RIO generates these requests based on just two inputs—a replay clock $f_v$ and a direction flag provided by the users speed control knob. This system of demand-fed buffering permits bidirectional replay at any speed up to the maximum of the disc drive.

Figure 1A:
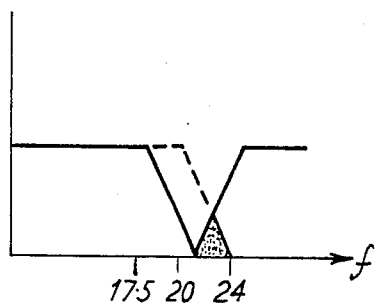
FIGS. 1(a) and 1(b) show the effect of speed variation on the replayed signals.
Figure 1B:
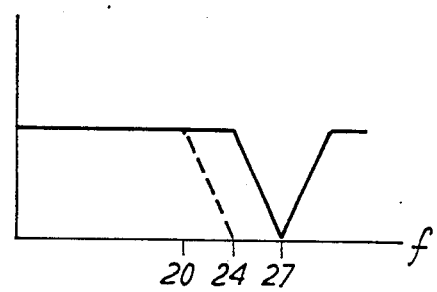
Figure 2A:
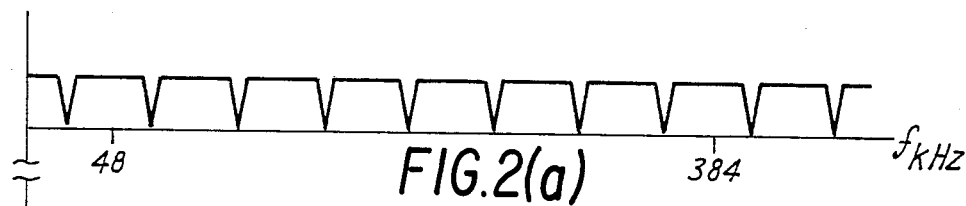
FIGS. 2(a)-(e) show frequency spectra arising in sampling frequency conversion.
Figure 2B:
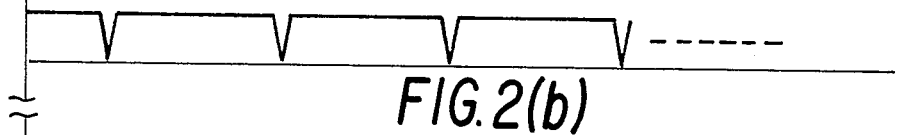
Figure 2C:
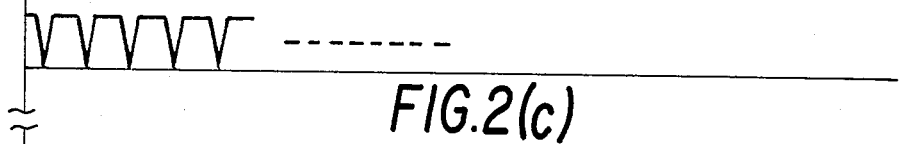

The demand-fed buffer provides data at a controlled speed but with proportionally varying sampling rate. The effect of this on the spectrum of the digital signals is shown for double speed and half speed in waveforms (b) and (c) of FIGS. 2(b) and 2(c), compared with normal speed, waveform (a). In each case, resampling at 48 kHz would alias a large number of the repeated spectra of the varispeed signal into the passband of the analogue reconstruction filter. A perfect SFC must therefore remove all these repeated spectra before resampling and also bandlimit the varispeed signal so that low frequencies do not extend beyond the required bandwidth when speed-up is used.

This is a severe digital filtering problem and has been explored for simple ratios of input and output sampling rate and arbitrary ratios. See Lagadec, R, Pelloni, D. P. & Weiss, D. A 2-channel 16 bit digital sampling frequency convertor for professional digital audio. IEEE Proc. ICASSP-82, Paris, March 1982, pp 93–96. If some intermediate analogue processing can be permitted before sampling then the RIO output could be converted back to an analog signal using a converter clocked by $f_v$, which would then be filtered by a variable cut-off reconstruction filter with a cut-off frequency dependent on $f_v$. An alternative is to use a reconstruction filter with a fixed cut-off frequency and to precede the digital to analog converter by a digital interpolator which is used to increase the sample rate by a factor N, chosen so that repeated spectra do not lie within the pass band of the fixed reconstruction filter. As the speed reduces, so N must be increased thus needing a time-varying discrete set of filter characteristics. In either event, the reconstruction filter is followed by an analog to digital converter clocked by $f_s$. An all digital SFC solution is however the preferred approach.

The general SFC problem can be stated as the need to calculate output samples at the timing of the output clock from a knowledge of the input samples with the timing of the input clock. This can be achieved by notionally increasing the sampling rate by a sufficiently large factor so that selecting the nearest sample at the output incurs an error which is always less than half one least significant bit (LSB).

FIG. 3 shows a "grid" of finely-spaced computed samples such that the error between a required output sample and the nearest computed sample is always small enough. FIG. 4 shows a better approach which enables more coarsely spaced computed samples to be employed. To obtain an output sample, denoted by a cross, it is necessary to compute only two samples (squares) bracketing the required sample and then interpolate linearly between the two computed samples. The computed samples will have a sampling rate $f_i$ intermediate $f_s$ and the very high rate required by FIG. 3. To get a quantitative measure of the necessary intermediate sampling rate, we can do a worst case analysis of the errors introduced.

The largest deviation from a straight line will occur at the peak of a sinusoid, and for an amplitude A and frequency f at their maximum values this produces an error:

$$\Delta x_{max} = \frac{A}{2}\left(\pi \frac{f}{f_i}\right)^2$$

With the requirement that the error $$\Delta x_{max} \leq \frac{q}{2} = A \cdot 2^{-(b+1)}$$

where b is the audio wordlength and q is the quantising interval, we get: $f_i \geq \pi \cdot f \cdot 2^{b/2}$ We must now define a specification so that a 'reasonable' increase of sampling rate $f_i$ is all that is required. For example with 14 bit accuracy and a 1 kHz sinewave, $f_i = 402$ kHz: and with 7 bit accuracy for a 10 kHz sinewave, $f_i = 355$ kHz.

Figure 2D:
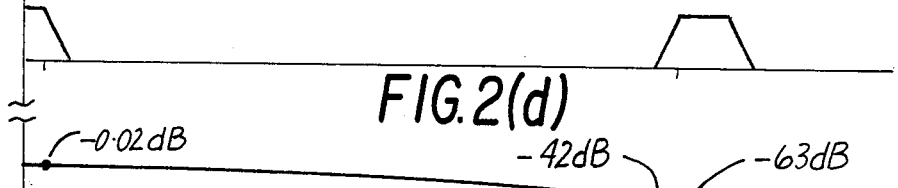
Figure 2E:
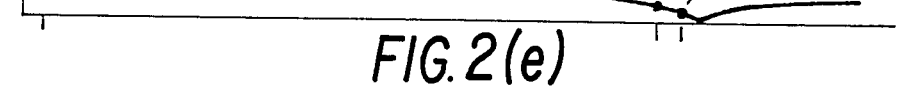

For this reason, an increase in sample rate of 8, to 384 kHz was chosen as acceptable for medium quality application to edit point location. We should also observe the effect of such processing on the spectrum of the output signal. When the output samples are generated by down-sampling from the $8*f_s$ 'grid', aliasing noise will be imposed on the baseband signal and this should be no greater than the quantisation noise. High stopband attenuation is therefore necessary in a stopband that notionally exists to an infinite frequency. The actions of an $8*f_s$ interpolating filter and a linear interpolator are shown in waveforms (d) and (e) respectively of FIGS. 2(d) and 2(e).

Figure 5:
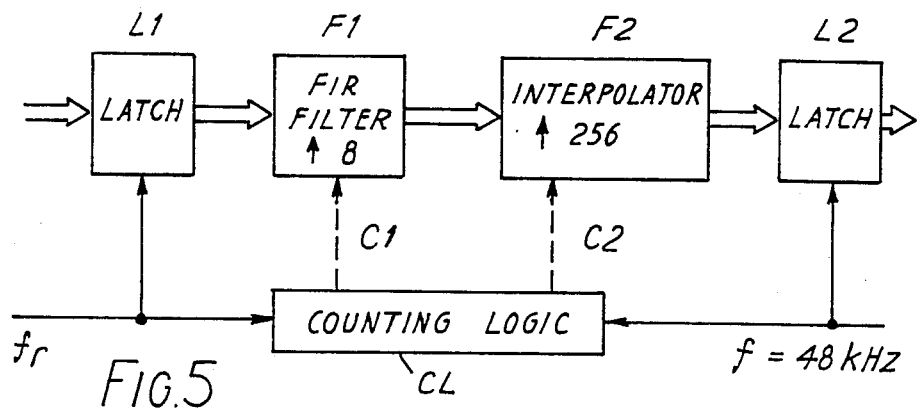
FIG. 5 shows the broad outline of a circuit for implementing up-conversion and first order interpolation.

FIG. 5 shows the basic circuit. Input samples are clocked into a latch L1 at $f_v$ and output samples are clocked out of a latch L2 at $f_s = 48$ kHz. A first finite impulse response (FIR) filter or interpolator F1 produces the required computed samples effectively at the rate $f_i = 8*f_v$ and a second filter F2 or linear interpolator, interpolating to 8 bits produces the required output sample. Counting logic CL counts input rate pulses MOD output rate pulses to produce an 11-bit value of which the 3 most significnt bits form the coefficient C1 for the filter F1 (effectively determining which of the eight possible pairs of computed samples are required to bracket the desired output sample) with the 8 least significant bits provide the interpolation coefficient C2 for the filter F2. This approach was developed because of the practicality of selecting or calculating the coefficients for the filters in real-time. FIG. 5 shows the processing schematically where the coefficients are either selected or calculated in the counting logic CL.

Figure 6:
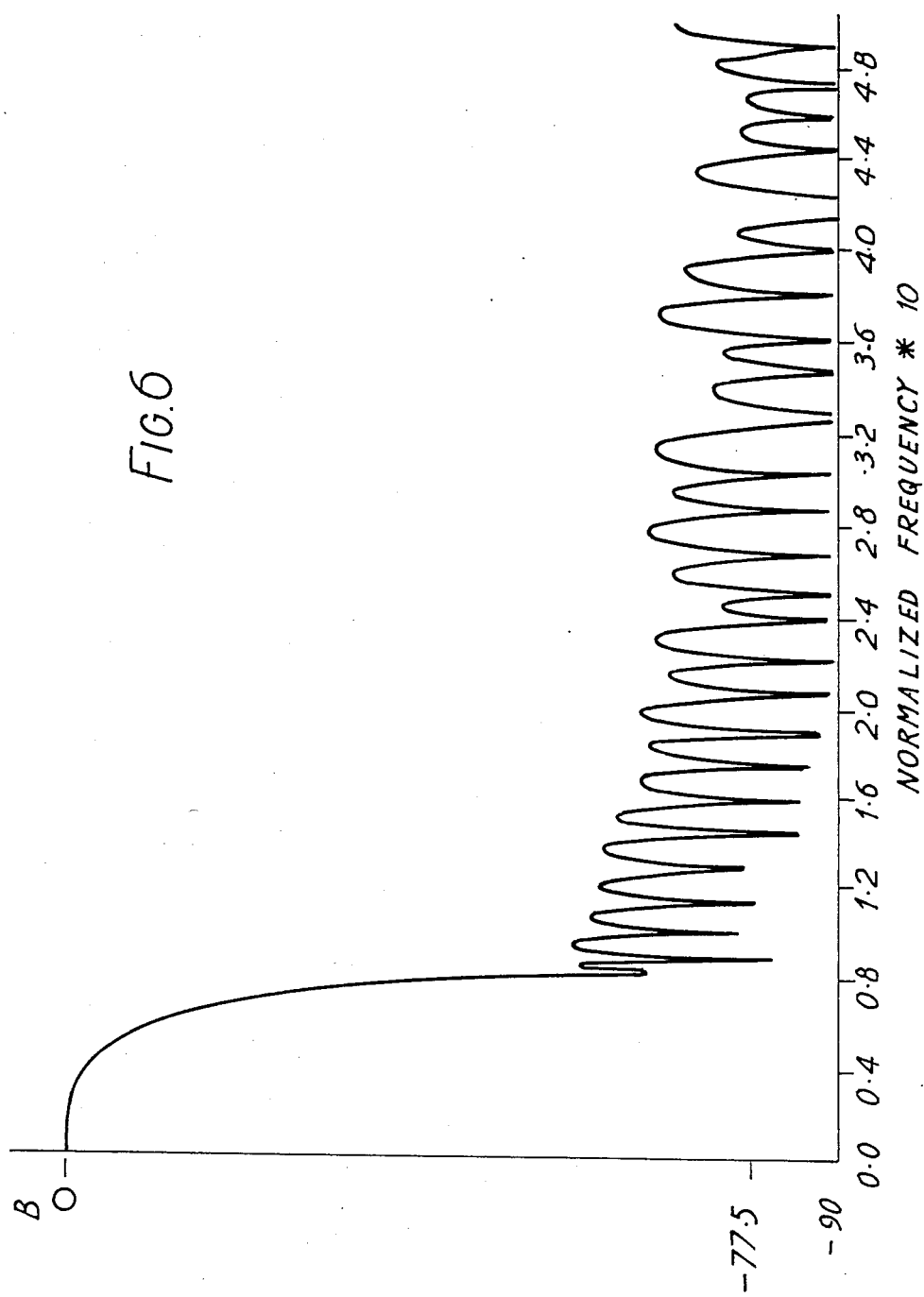
FIG. 6 shows the response of a finite impulse response filter.

The first filter F1 has a passband extending to 8 kHz to permit up to double speed operation. The stopband is chosen at 32 kHz as a compromise between quality, keeping the order of the filter low and maximising the stopband attenuation at above 75 dB. The initial design used a Kaiser window technique resulting in a 63 stage transversal filter with 0.5 dB passband ripple. The effect of coefficient truncation to 16 bits is shown in FIG. 6.

The second filter is a linear interpolator with a (sin $\chi/\chi)^2$ amplitude response. This attenuates the first spectral repetition at the output of the first filter by 63 dB at the alias produced at 10 kHz and 50 dB at the alias produced at 20 kHz.

Figure 8:
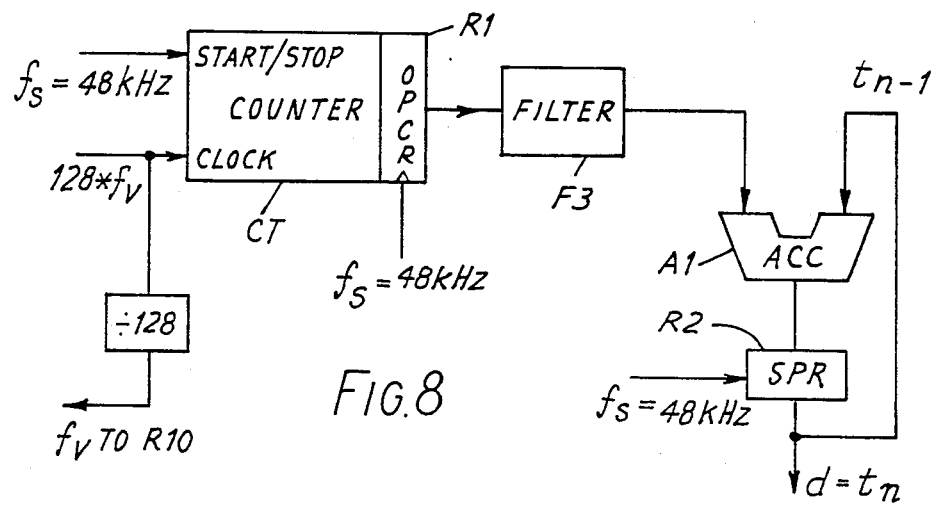
FIG. 8 shows a non-preferred circuit for calculating output sample times.

As indicated in FIG. 4, the choice of filter coefficients is determined by a measurement of relative position of input and output sampling rates. If the input and output sampling frequencies are stable, the relative positions could be calculated with great accuracy by counting and averaging as shown in FIGS. 7 and 8. From FIG. 7, the recursive relationship:

$$t_n = [t_{n-1} + P_{s(out)}] \text{ MOD } P_{s(in)}$$

is used to generate the displacements $d_1$, $d_2$ etc, where $P_s$ denotes sampling period. If $T_m$ denotes the current input sample time, the displacement d for the current output sample time is $d = t_n - T_m$.

In FIG. 8 a counter CT counts pulses at 128 times the input sample rate $f_v$ over periods $P_{s(out)}$ defined by the application of $f_s$ to a start, stop (reset) input of the counter. The counter output is latched in an output period count register (OPCR) R1. A digital filter F3 can smooth short-term fluctuations in the period count. An accumulator A1 adds the period count to the value $t_{n-1}$ and provides $d = t_n$ in a sample position register (SPR) R2. If $P_{s(in)}$ is chosen as a power of 2, the accumulator A1 of FIG. 8 provides the modulo addition. The final latch R2 of FIG. 8 will therefore under steady state conditions provide displacement information at the output sampling rate of $f_s$ (48 kHz). However, in rock and roll the speed is varying continuously and there will be tracking errors between the position data and the audio samples to which it refers.

The filters F1 and F2 of FIG. 5 could be arranged with a FIFO memory represented as a ring buffer at the input, the audio data samples at $f_v$ being padded with 7 zero-value samples and input to the FIFO. Two F1 filters (F1A and F1B) would be needed to form the two output samples bracketing the desired sample (FIG. 4). The SPR cycles through a complete count at a rate equal to $f_v$ but the 'phase' information in the count controls the reading of the FIFO, the selection of appropriate coefficients from a limited list in F1, and the linear interpolation coefficient in FIG. 4 is directly supplied from the lower bits. Thus, all the filters would operate synchronously at the output rate of 48 kHz.

Severe changes in speed will cause the FIFO to empty or fill and it would almost certainly be necessary to apply a higher order of prediction to the filter prior to the SPR together with a much larger FIFO buffer. A closed loop control system monitoring the read and write address pointers to provide an error signal could be used to modify the output period count register (OPCR) and maintain tracking. The extra complexity of circuitry, and difficulty in analysing the dynamic behaviour of this system for a wide range of varispeed manipulation led to a search for an alternative method.

In a SFC application, the SPR data must be calculated from observations of the input and output clocks. However, in varispeed applications, the SPR data can be computed direct from the required speed and therefore $f_v$. There can, therefore, be a precisely known relationship between the SPR data and the input and output sampling clock times under all the circumstances.

Figure 9:
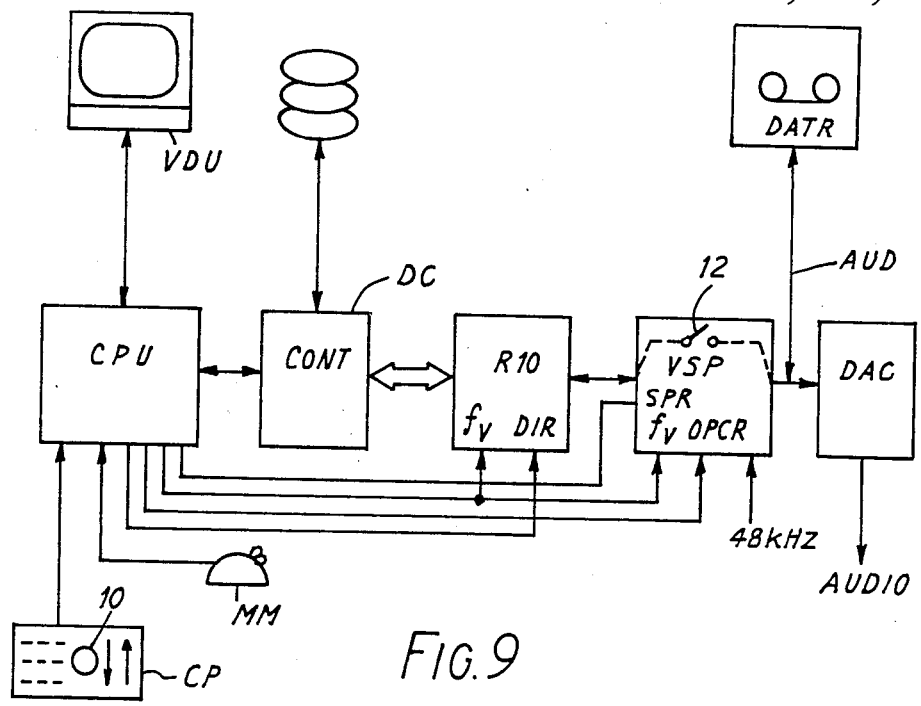
FIGS. 9 and 10 show two complete systems embodying the invention.
Figure 10:
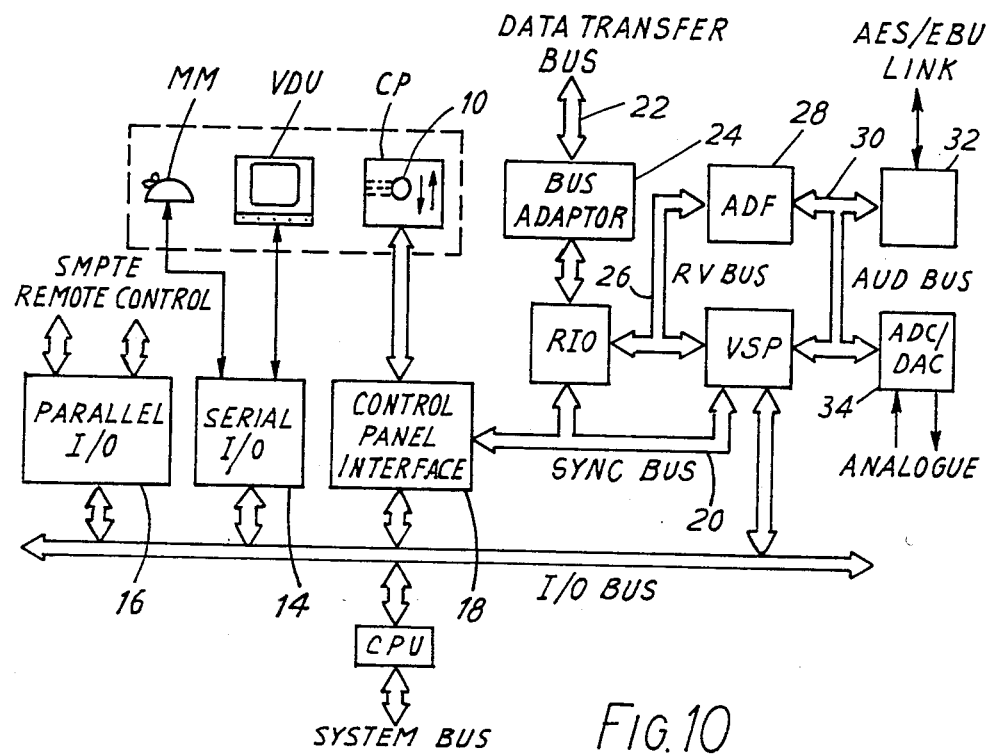

FIG. 9 shows the basis of a system embodying the invention while FIG. 10 shows a more developed version thereof. A control panel CP is used to input control information to a CPU (e.g. a 68000 CPU) provided also with a mouse input device MM and a VDU. The control panel CP includes a knob 10 which is used as described below to determine $f_v$. The CPU controls a disc controller DC which acts as the source of input samples to an RIO buffer acting as described above, to demand data from the disc controller DC at a rate determined by $f_v$ and in the direction determined by a direction signal DIR also provided from the control panel CP via the CPU.

The CPU also synthesizes OPCR and SPR, as described below and feeds these to a varispeed processor (VSP) which performs the F1 and F2 filtering operations of FIG. 5 and which are known per se, and provides the output samples on a bus AUD. This may feed the digital audio, e.g. via an AES/EBU line to a digital audio tape recorder DATR, and to a digital-to-analog converter DAC to re-create analog audio. The VSP may be selectively switched out of operation as symbolized by a bypass switch 12.

FIG. 10 shows a more developed version in which the CPU communicates with other items via an I/O bus with a serial input/output interface 14 for the VDU and mouse, a parallel input/output interface 16, e.g. for an SMPTE remote control facility, and a control panel interface 18 for the control panel CP. The $f_v$, SPR and OPCR data are communicated to the RIO and VSP from the interface 18 by way of a SYNC bus 20. The precise interaction between control wheel, faders, etc and the formatting and processing in RIO and the VSP demand a direct synchronous link. If the data transfers were handled directly by the system processor, its performance would be greatly reduced. The bus guarantees virtually instant response and a steady update rate so that gain and speed control vary smoothly.

On the other hand, the overall control and monitoring of the special purpose hardware is managed at relatively low data rates using a proprietary I/O bus. The system has access to all the control information and status of the various units without the overhead of interrupts at the rate of the SYNC bus. Connection to other devices for synchronisation and SMPTE remote control can be made using standard proprietary modules which interface to this bus. The RIO interfaces with a data transfer bus 22 via a bus adapter 24 (corresponding to the disc controller in FIG. 9). The input samples pass from the RIO to the VSP over a RVbus 26 which is bidirectional and can carry at least two audio channels plus formatted auxiliary data. (This data relates to additional non-audio data carried by the AES/EBU standard serial interface).

When the system operates at normal speed, audio is transferred without processing through the VSP to the AUDbus 30 which is a time-multiplexed bus operating at a binary power of the audio sampling rate. The auxiliary data is separately handled by an auxiliary data formatter (ADF) 28 which transfers the auxiliary data to the AUDbus.

When the system operates with variable speed, the auxiliary data has no meaning (since data of this kind in general cannot be transferred to a new sampling rate). The VSP processes the audio data in the manner previously described and transfers it to the AUDbus.

The AUDbus may be used readily to achieve routing functions between various devices such as an AES/EBU terminal 32 or analogue to digital/digital to analogue convertors 34.

The system bus does not have to be the same as the data transfer bus. The control panel interface 18 is based on a 6809 microprocessor and has the capcity to 'smooth' the data from the wheel or knob 10 and so provide the smoothest sequence of OPCR values consistent with accurate replay. Update rate of each parameter on the SYNCBus is up to 100 Hz. Within the VSP, the SPR is calculated from the OPCR by software.

Figure 11:
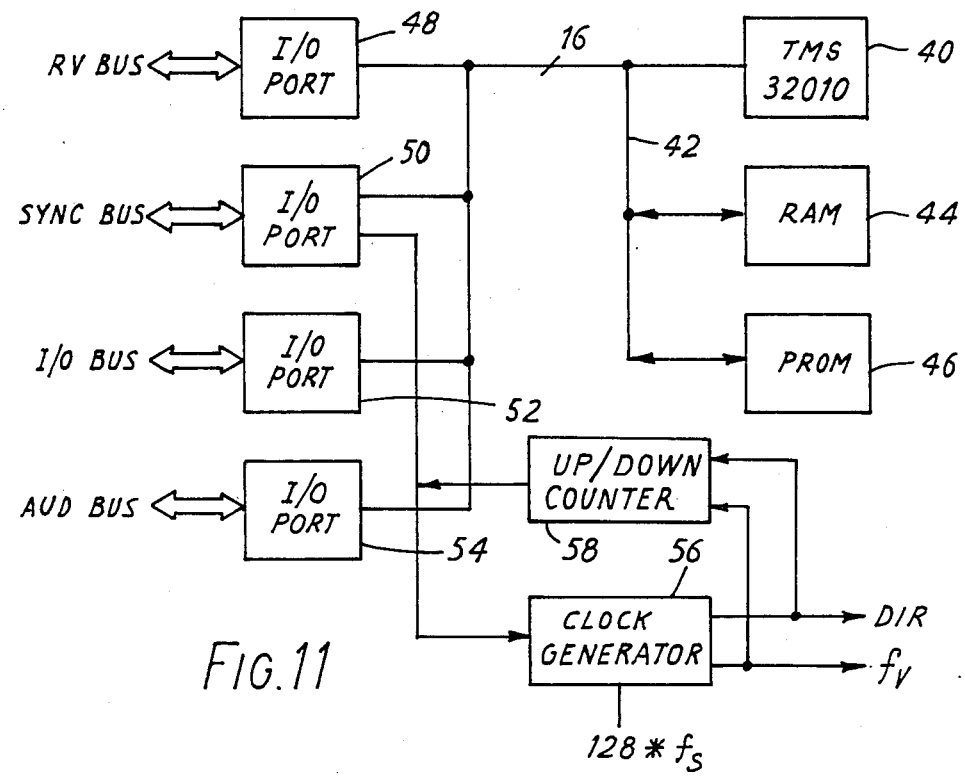
FIG. 11 shows part of FIGS. 9 and 10 in detail, in a microprocessor-based implementation.

It is emphasised that all items of FIG. 10 are known per se and need not be described in detail. The invention lies in the way $f_v$, SPR and OPCR are synthesized, as will be explained below. However, FIG. 11 shows a possible implementation of the VSP.

The required F1 and F2 processing is implemented by a TMS 32010 signal processing integrated circuit 40 which is served by a 16-bit bus 42, a RAM 44 and a ROM 46 storing the programs required to implement the functions of the FIR filter F2 and the linear interpolation filter F2. The bus 42 communicates with the buses described with reference to FIG. 10 by way of interfaces 48, 50, 52 and 54. The interface 50 for the SYNC bus also communicates with a clock generator 56 which provides the signals $f_v$ and DIR. An up/down counter 58 counts $f_v$ in the sense of DIR to provide the value required to inform the user of the current time delay through the buffer. Although these signals and SPR and OPCR are provided by software functions in the preferred embodiment, they could be provided by hardware and FIG. 12 shows the circuitry involved in this.

The TMS program runs at a 48 kHz rate. New OPCR values are transferred using the I/O port 50 and occur synchronously to the 48 kHz clock. Variable rate data from the RVbus is read by the TMS320 by responding to an interrupt from I/O 48.

The TMS 32010 runs with a 200 ns cycle and must run its program at a 48 kHz rate. To maximise the number of instructions that can be executed, the processor runs at its maximum speed and polls the 48 kHz sample clock before starting its program. By these means, 104 instructions can be executed, sufficient to execute the SFC filter and maintain the SPR with I/O etc.

Figure 12:
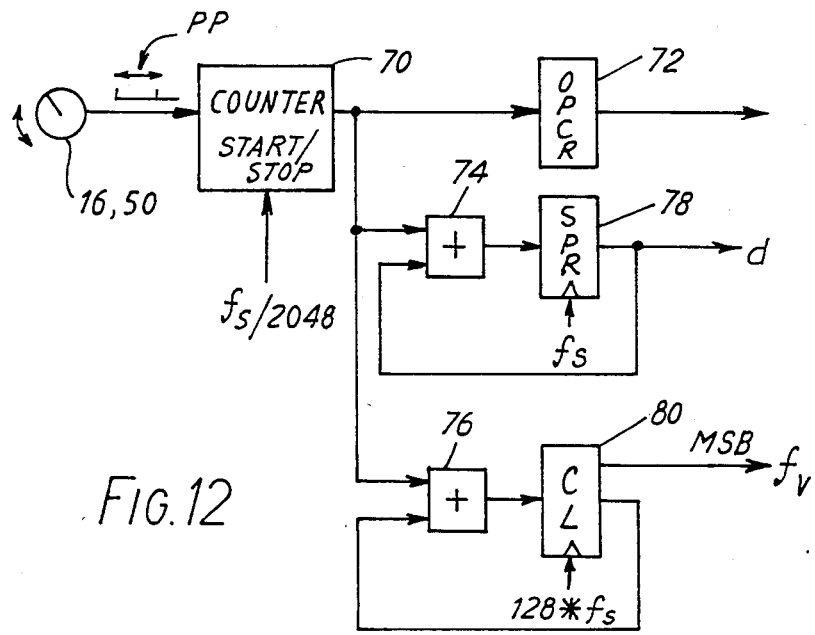
FIG. 12 shows part of FIGS. 9 and 10 in a hardware implementation.

FIG. 12 illustrates how a control device such as the wheel 16, which produces pulses PP as it turns at a rate proportional to the required replay speed, is processed to provide:
1. 'period' information updated at, say, 25 times per second.
2. The synthetic SPR data.
3. A precision varispeed clock in synchronism with SPR data.

Figure 13:
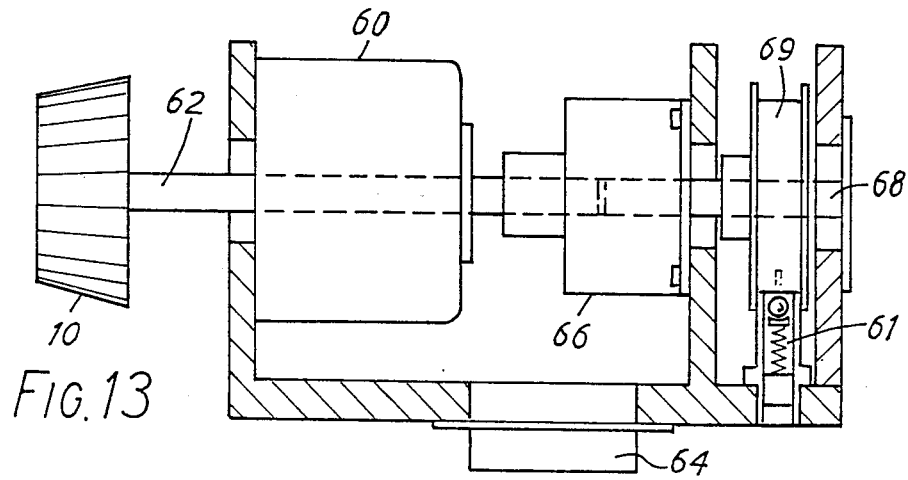
FIG. 13 shows a mechanical input device included in FIG. 10.

The knob 10 (FIG. 13) is fixed on the shaft 62 of an encoder 60 which generates pulses as it rotates. An optical incremental encoder is ideally suited to this and with 500 pulses per revolution, a smooth 'feel' is ensured. Under typical circumstances, manual control will result in rotation rate of 0.1 Hz to 5 Hz corresponding to pulse intervals of 0.4 ms–20 ms. The OPCR will register a 'period' 0–127 according to speed of rotation, with an update rate of 25 Hz. Note that a count of zero corresponds to no rotation.

A connector 64 carries the signals from the encoder and also a control signal for selectively engaging a clutch 66. When the clutch is engaged, the shaft 62 is connected to a shaft 68 carrying a disc 69 cooperating with a spring-loaded detent 61. When the clutch 66 is engaged each click of the detent mechanism corresponds to a given increment or decrement of replay rate. The pulses from the encoder 60 are input directly or after integration to a counter 70 in FIG. 12. Each pulse corresponds to 1.5/500 s audio. The counter is reset at the rate $f_s/2048$ and its contents are held in a latch OPCR 72 whose contents are actually inversely proportional to the replay sampling period. Adders 74 and 76 add the contents of the counter into overflowing accumulators SPR 78 and CL 80 clocked at the 48 KHz fixed sampling rate $f_s$ and 128 times this rate respectively. The number of SPR represents the sample displacement as in FIG. 7 while the MSB of CL provides the replay clock $f_v$.

The "gearing" between the encoder knob and the pulses input to the counter in FIG. 12 can be varied for giving coarse and fine control over replay rate adjustments.

Since all the timings of audio data are synchronous with, in this example, 128*$f_s$, there is no need for FIFO arrangements since it is not possible for the coefficient selection to track incorrectly with the varispeed control.

The use of an overflowing accumulator to produce the varispeed clock $f_v$ will introduce one impairment. Clock jitter will be generated for all speeds other than $2^n$:1. For example, using an accumulation clock of 128*$f_s$ will result in jitter of ±80 ns at the 25 Hz update rate. Subjective results suggest that this is unlikely to cause disturbing effects, particularly for medium quality applications. In particular, the edit point location process itself can be regarded as inherently jittery!

The OPCR of FIG. 8 is generated from the control wheel directly. Filtering is not necessary as it is the case for an unknown replay sampling rate but may be useful to smooth the movements of the control wheel. The latter could use a well-known first order recursive filter implemented by an 8-bit microprocessor in the CPI 18.

The wheel can be used in 3 distinct modes:
1. Rock and roll—free running with movement intended to produce a change in location.
2. Varispeed—free running with movement producing a change in speed. This requires initialisation at normal speed with a 'CAL' indicator.
3. Calibrated speed—with a detent and associated display.

For position control the counter in FIG. 12 measures the time between adjacent wheel pulses. For velocity control, the counter is incremented or decremented in proportion to the number of pulses received. In each case the upper and lower bounds of the counter must be considered. The incremental encoder 50 produces quadrature outputs so that a direction signal is easily generated.

The varispeed processing can be added as a peripheral to an editing system since RIO is configured as a demand-fed buffer. The problems of real-time communication with the editor are therefore avoided.

A particular need for the operator of the editor is to be informed of the precise time-code of the audio material being replayed. Special arrangements must be made since the audio buffer completely decouples the timing of its input and output. An up-down counter circuit 58 provides means for this by counting clock pulses, $f_v$, back and forth about a zero reference forced at each interrogation. Thus the CPI 18 may request at convenient times the precise timecode at that time of the replayed output using I/O PORT 50 and the SYNCbus. This data can in turn be passed back to the editing system.

An all-digital signal processing method has been described for the reproduction of digital audio over a bidirectional range of speeds from zero to double speed. A number of simplifications are identified which permit the processing to be executed on a single low cost signal processing chip. Further simplifications are achieved by controlling the system in a quantised manner but nevertheless maintaining adequate signal quality and a subjectively smooth control. Thus the apparatus described above has the following features.

1. Multi-stage filter design to simplify the implementation.
2. Real-time calculation of filter coefficients for further simplification of the design.
3. Filter specifications are somewhat relaxed for edit point location.
4. Finely quantised speed changes related to the final 48 kHz sampling rate to further simplify hardware design.
5. Processing requirements compatible with single chip signal processors (e.g. TMS32010) eliminating analogue components.

I claim:

1. Apparatus for effecting variable speed replay of digital audio with a constant output sampling rate, comprising a manually operable device emitting pulses at a rate establishing an input replay rate for digital input samples, means for counting these emitted pulses over successive intervals to produce in respect of each such interval a number representative of the replay rate, means for adding said number representative of the input replay rate into an overflowing accumulator device at a predetermined rate, and an interpolating device responsive to output signals from said overflowing accumulator device to produce output samples at said constant output sampling rate by interpolation between the digital input samples produced by replay.

2. Apparatus according to claim 1, wherein said manually operable device includes a device producing pulses at a rate corresponding to a desired rate of change of rate of replay and an integrating device.

3. Apparatus according to claim 1, comprising an overflowing accumulator device which is reset at a multiple of said constant output sampling rate and which produces pulses of a clock signal for the variable speed replay.

4. Apparatus according to claim 3, comprising an up/down counter which counts the pulses in the said clock signal in the sense determined by a signal which indicates the direction of replay.

5. Apparatus according to claim 1, comprising an overflowing accumulator device which is reset at said constant output sampling rate to provide a number representing the position of said output samples relative to said samples produced by replay.

6. Apparatus for effecting variable speed replay of digital audio with a constant output sampling rate, characterised by a demand-fed buffer responsive to pulses establishing an input replay rate to provide digital input samples, an interpolating device responsive to the displacement between an output sample at the constant rate and a sample at the input rate to create output samples at the constant rate, a manually operable device emitting pulses at a rate determined by the rate of actuation of the device, a counter counting the emitted pulses over fixed intervals of time to produce a regularly updated first number proportional to the input rate, an overflowing accumulator means clocked at a multiple of the constant rate to add in said first number and produce overflow pulses at the input rate, and a second overflowing accumulator means clocked at the constant rate to add in the said first number and produce a second number representing said displacement.

7. Apparatus according to claim 6, wherein interpolating device comprises a finite impulse response filter responsive to the input samples to create samples at a higher frequency which is a multiple of the input rate and a linear interpolating filter, and wherein a more significant portion of said second number determines a coefficient of said finite impulse response filter while a less significant portion of said second number determines the interpolation coefficient of said linear interpolating filter.

8. Apparatus according to claim 6, wherein the pulses from manually operable device are emitted at a rate proportional to the rate of actuation of said device.

9. Apparatus according to claim 6, wherein the pulses from said manually operable device are emitted at a rate which is changed at a rate proportional to the rate of actuation of said device.

10. A method of producing digital audio output samples at a constant rate from input samples at a variable rate, wherein interpolation between the input samples is effected in accordance with the input-output sample displacement to provide the output samples, characterised in that pulses at a rate representing a desired input sample rate are counted over successive fixed periods to produce a regularly updated first number proportional to the variable rate, said first number is repeatedly added at a rate high relative to the constant rate to produce at each overflow of the addition a pulse of the variable rate, and said first number is repeatedly added at the constant rate to produce a second number representing said displacement.

* * * * *